Dec. 13, 1960 A. D. BAKER 2,963,954
AUTOMOTIVE HEATING, VENTILATING AND DEFROSTING SYSTEMS
Filed Sept. 17, 1956 8 Sheets-Sheet 2
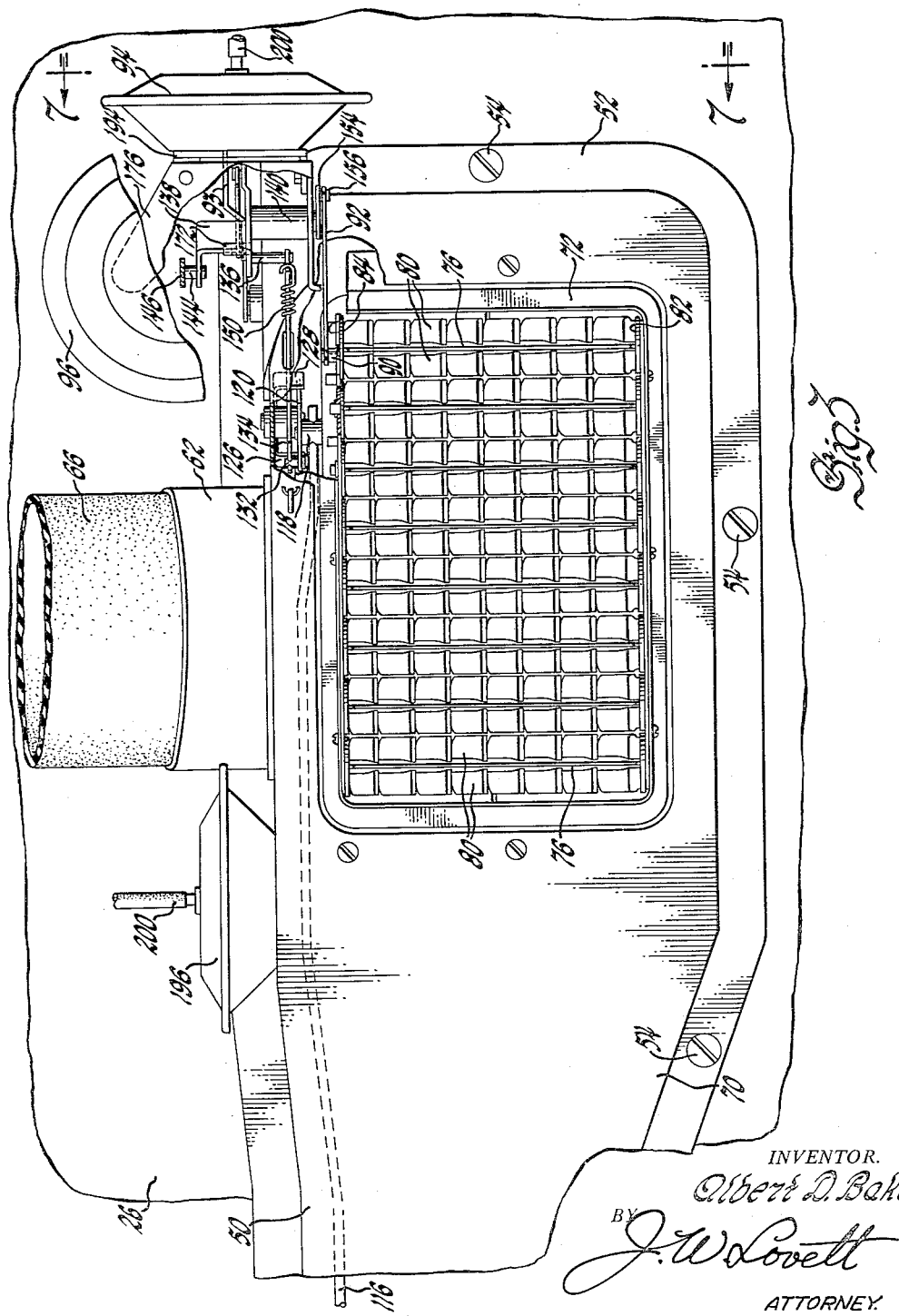
INVENTOR.
Albert D. Baker
BY J. W. Lovett
ATTORNEY.

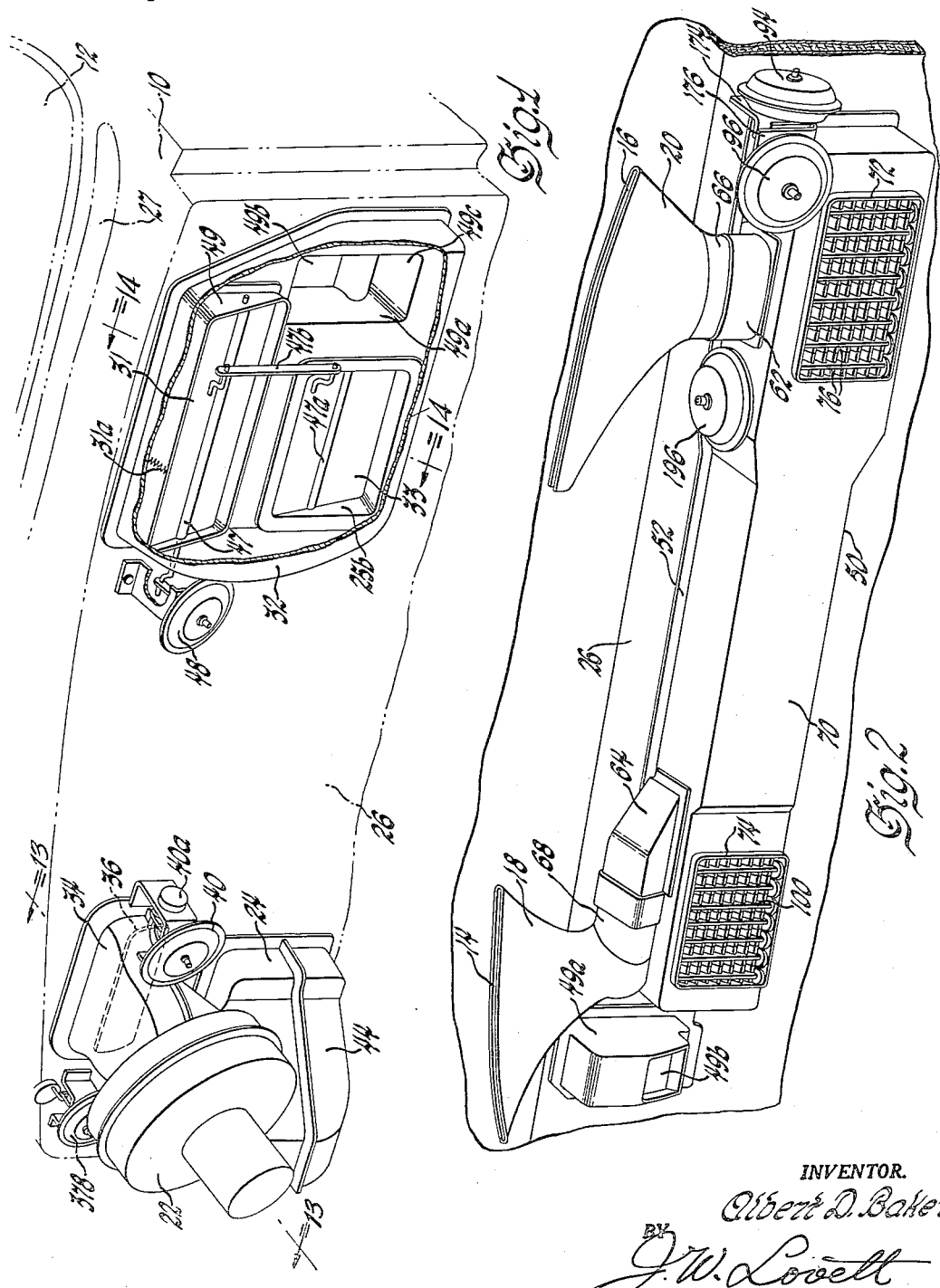

INVENTOR.
Albert D. Baker
BY J. W. Lovett
ATTORNEY.

Dec. 13, 1960     A. D. BAKER     2,963,954
AUTOMOTIVE HEATING, VENTILATING AND DEFROSTING SYSTEMS
Filed Sept. 17, 1956     8 Sheets-Sheet 5

INVENTOR.
Albert D. Baker
BY J.W. Lovett
ATTORNEY.

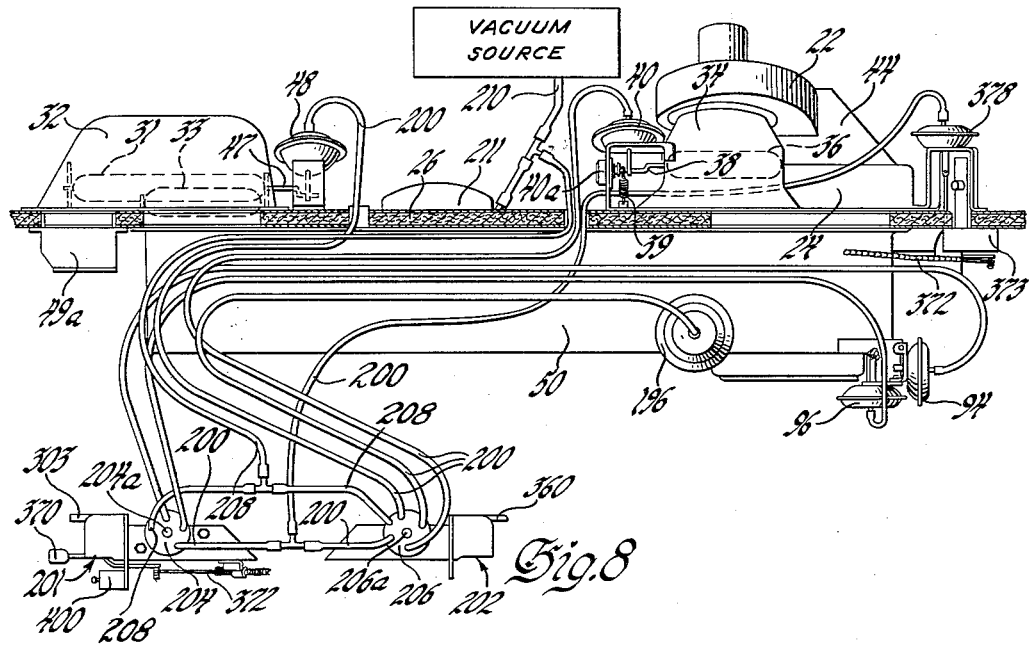

Dec. 13, 1960 A. D. BAKER 2,963,954
AUTOMOTIVE HEATING, VENTILATING AND DEFROSTING SYSTEMS
Filed Sept. 17, 1956 8 Sheets-Sheet 7
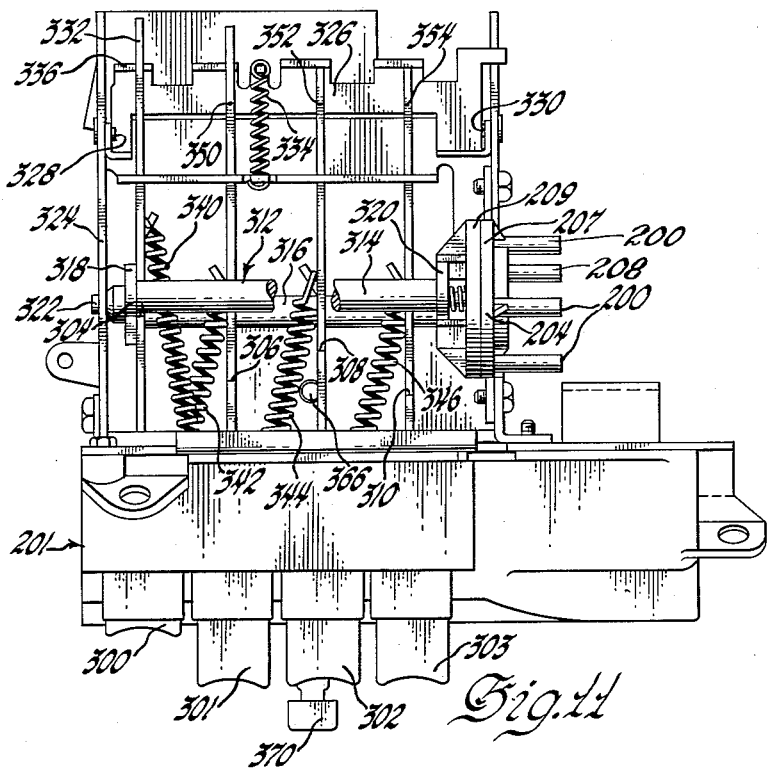
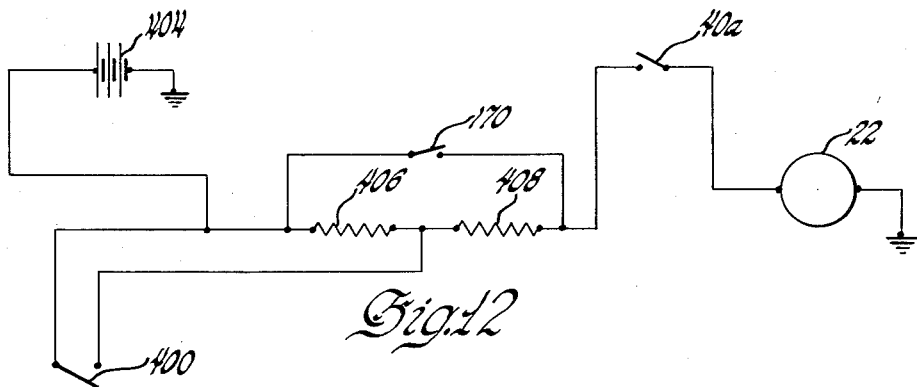
INVENTOR.
Albert D. Baker
BY J. W. Lovett
ATTORNEY.

Dec. 13, 1960   A. D. BAKER   2,963,954
AUTOMOTIVE HEATING, VENTILATING AND DEFROSTING SYSTEMS
Filed Sept. 17, 1956   8 Sheets-Sheet 8

INVENTOR.
Albert D. Baker
BY J. W. Lovett
ATTORNEY.

United States Patent Office 2,963,954
Patented Dec. 13, 1960

2,963,954

AUTOMOTIVE HEATING, VENTILATING AND DEFROSTING SYSTEMS

Albert D. Baker, Lansing, Mich., assignor to General Motors Corporation, Detroit, Mich., a corporation of Delaware Filed Sept. 17, 1956, Ser. No. 610,223

8 Claims. (Cl. 98—2)

This invention relates to heating, ventilating and defrosting systems and specifically to such systems as employed in automotive vehicles.

A system for heating and ventilating an automobile obviously should be compact because of the lack of available space. It should also be such that it need not be revised to any appreciable extent if it is to be supplemented by an air conditioning or refrigeration system during or subsequent to assembly of the vehicle. Convenience for operating the instrumentalities necessary in the system is much desired and effective adjustment to achieve proper air distribution under changing conditions with avoidance of objectionable drafts is a requisite for optimum passenger comfort. Automatic closure of ducts leading to the passenger compartment is desirable when the vehicle is not in use.

To these ends, an object of the present invention is to provide an improved automotive heating and ventilating system which preferably is accompanied by means for defrosting a windshield. Another object is to provide a compact heating and ventilating system which is conveniently operable to secure proper air circulation as desired by vehicle passengers and under varying conditions. Still another object of the invention is to provide a simple arrangement associated with a minimum of controls for defrosting the windshield of a vehicle. Another object is to provide an automotive duct system for admitting outside air under normal operating conditions and automatically preventing air, dust or snow from seeping in when the vehicle is not operating. One other object is to provide a heating system in which quick warm-up is accompanied by low velocity air without aspirator effect and sustained heating is accomplished with aspirator effect for maximum comfort.

One feature of the invention is an elongated manifold arrangement on the rear side of a vehicle fire wall for distributing air by way of calibrated outlets leading to spaced zones of the passenger compartment as well as serving as a defroster duct. Another feature includes at least one valve controlling windshield defroster air flow from a manifold and actuated automatically upon variation of the air pressure in the latter. An added feature is a multiple vane and fin arrangement for directing air being discharged from an opening in a manifold. Another feature pertains to a manifold having a discharge opening fitted with rotatable vanes controlling an air distributor opening and actuatable into three positions: (1) closed, (2) discharging in a plane normal to the plane of the opening, and (3) intermediate those positions—i.e.—inclined downwardly and outwardly toward a side of the passenger compartment. One other feature is a push button control associated with a heating, ventilating and defrosting system to enable one easily to operate the instrumentalities determining the working of the system.

The invention will now be more particularly described by reference to the accompanying drawings and thereafter pointed out in the claims.

In the drawings:

Fig. 1 is a perspective view of a portion of the windshield and cowl on an automobile to which one embodiment of the present invention has been applied, portions being broken away better to illustrate the invention;

Fig. 2 is a perspective view of a manifold and defroster nozzles arranged in the passenger compartment and adapted to cooperate with the structure shown in Fig. 1;

Fig. 3 is an elevation view, drawn to a larger scale, of the right-hand end of an air distributor manifold shown in Fig. 2 looking forwardly from the vehicle passenger compartment and showing a portion of the pneumatic motors and a part of the vehicle fire wall;

Fig. 4 is a sectional view taken along the line 4—4 of Fig. 3a;

Fig. 8 is a sectional view through the fire wall with the structures of Figs. 1 and 2 arranged thereon and a diagrammatic representation of a vacuum control system as applied thereto with the defroster structure omitted;

Fig. 9 is a front elevation view of a push button unit by means of which the heating and defrosting are controlled;

Fig. 10 is a front elevation view of a push button unit by means of which the ventilation is controlled;

Fig. 11 is a plan view of the push button control unit of Fig. 9;

Fig. 12 is a diagrammatic representation of the electrical circuitry employed;

The system herein disclosed has been developed specifically for use in an auto body of the type utilizing an elongated outside air inlet at the base of the windshield, this inlet leading forwardly and through or over the fire wall for removal of entrained moisture and heating of the air as steps preliminary to introducing that air rearwardly and through the fire wall into the passenger compartment. Such a body is disclosed in the application for United States Letters Patent Serial No. 392,823 filed November 18, 1953, and issued May 27, 1958, as Patent No. 2,836,113, in the name of Robert Seyfarth and entitled "Heating and Ventilating System or Apparatus for Vehicles." The present invention is not limited to association with such a body, however, as the source of ambient or outside air employed may be in a forward portion of the vehicle and in close proximity to a fender headlight or the engine radiator instead of in the cowl.

Figure 13:
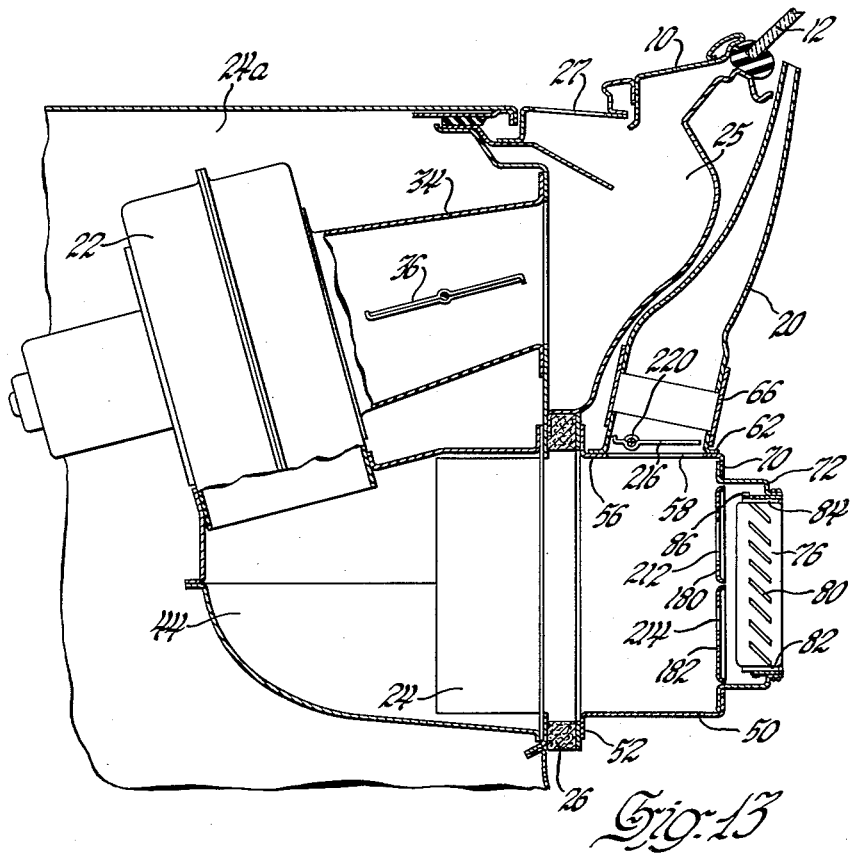
Fig. 13 is a view looking substantially in the direction of the arrows 13—13 in Fig. 1, drawn to a larger scale with parts being broken away and in section.
Figure 14:
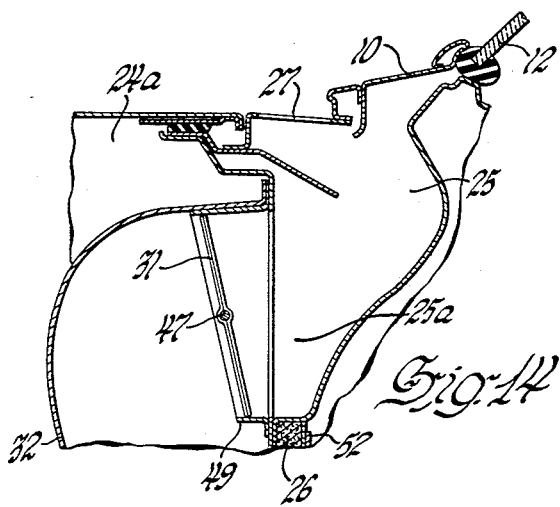
Fig. 14 is an enlarged sectional view of certain parts looking substantially in the direction of the arrows 14—14 in Fig. 1.

The cowl portion 10 of an automobile is shown in Figs. 1, 13 and 14, and upon this is mounted a conventional windshield 12 to the rear of which are located the openings 14 and 16 (Fig. 2) of defroster nozzles 18 and 20, respectively. These nozzles are directed upwardly and rearwardly for the impingement of air against the windshield 12 as is conventional.

An outside air inlet duct is provided including a blower 22 and a heater generally indicated at 24. The latter includes an enclosed core defining rearwardly directed air passages and conventional passages for engine coolant. The blower 22 and heater 24 are mounted in the engine compartment 24a of the vehicle in such a way as to receive air from a cowl chamber 25 (Fig. 4) located between a fire wall 26 and the instrument panel. The air is admitted to the cowl chamber 25 through an elongated and grilled opening 27 (Fig. 1) extending substantially the full length of the cowl 10 and located immediately forward of the windshield 12. The air chamber 25 in the cowl is such that air entering through the grilled opening 27 enters the chamber 25 and then may pass forwardly through an opening 25a (Figs. 4 and 14) in the fire wall 26 into the upper end of a blister 32 located on the forward side of the fire wall at the left side of the vehicle. This air also may enter a duct 34 fixed to the fire wall at the right side of the vehicle and communicating with the inlet side of the blower 22. The passage leading through the duct 34 is controlled by a butterfly valve 36 (Figs. 1, 8 and 13) and the latter is adapted to be actuated through suitable crank linkage 38 by a pneumatic motor 40 and a spring 39 (Fig. 8). A vacuum line 200 leads to a chamber in the motor 40 which chamber is partially defined by a diaphragm connected to move with and actuate the linkage 38. The lower or discharge end of the blower 22 is connected by a duct 44 to the heater 24.

Figure 4:
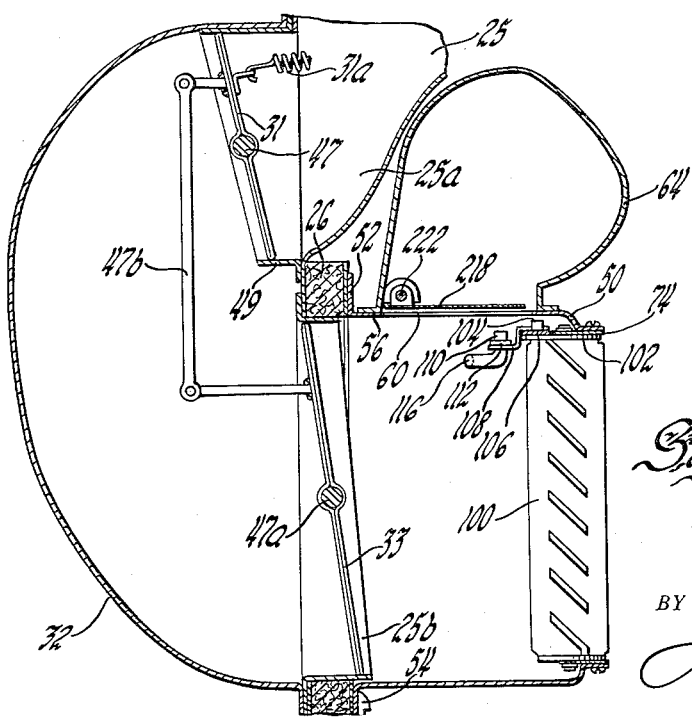

Air admitted from the cowl chamber 25 to the upper portion of the blister 32 is by way of the opening 25a cut in the fire wall 26 as heretofore stated, but it will be understood that passage of air through it is controlled by an upper valve 31 as well as a lower valve 33 located transverse to another and smaller fire wall opening 25b (Figs. 1 and 4). In the present installation the valves are shown mounted for rotation by means of shafts 47 and 47a linked together by means 47b (Fig. 4) and controlled by a pneumatic motor 48 (Fig. 1). A spring 31a urges the valves 31 and 33 into their closed positions. A shield 49 surrounds the valve 31 to cooperate therewith in forming a proper closure and a drain tube is provided for the blister 32 although it is not illustrated in the drawings. A box-like housing 49a is fixed to the rear side of the fire wall 26 and to the left of the defroster nozzle 18. This housing has two openings 49b and 49c for discharging air received from the blister 32.

Figure 3A:
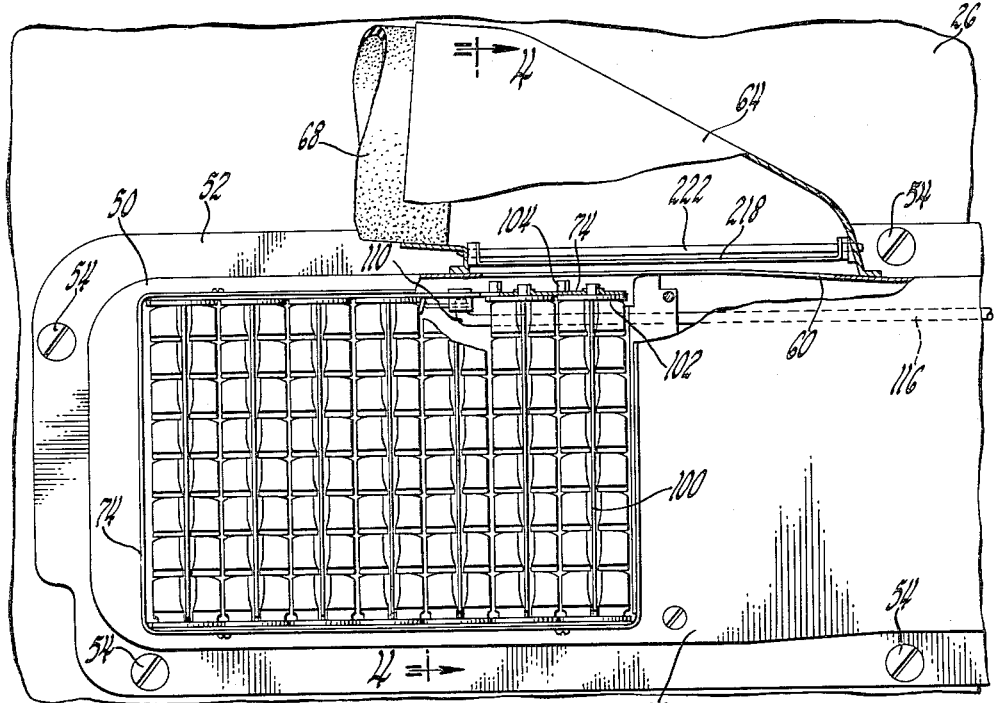
Fig. 3a is a view similar to that of Fig. 3 but showing the left-hand end portion of the manifold.

A horizontal elongated manifold 50 is mounted on the rear side of the fire wall 26 beneath the cowl chamber 25. This manifold is in the form of an elongated, U-shaped (in cross section) trough with closed ends and an open side facing the fire wall 26 and defined by a continuous flange 52. This flange is fixed to the fire wall 26 by fastenings 54 (Figs. 3 and 3a).

Figure 5:
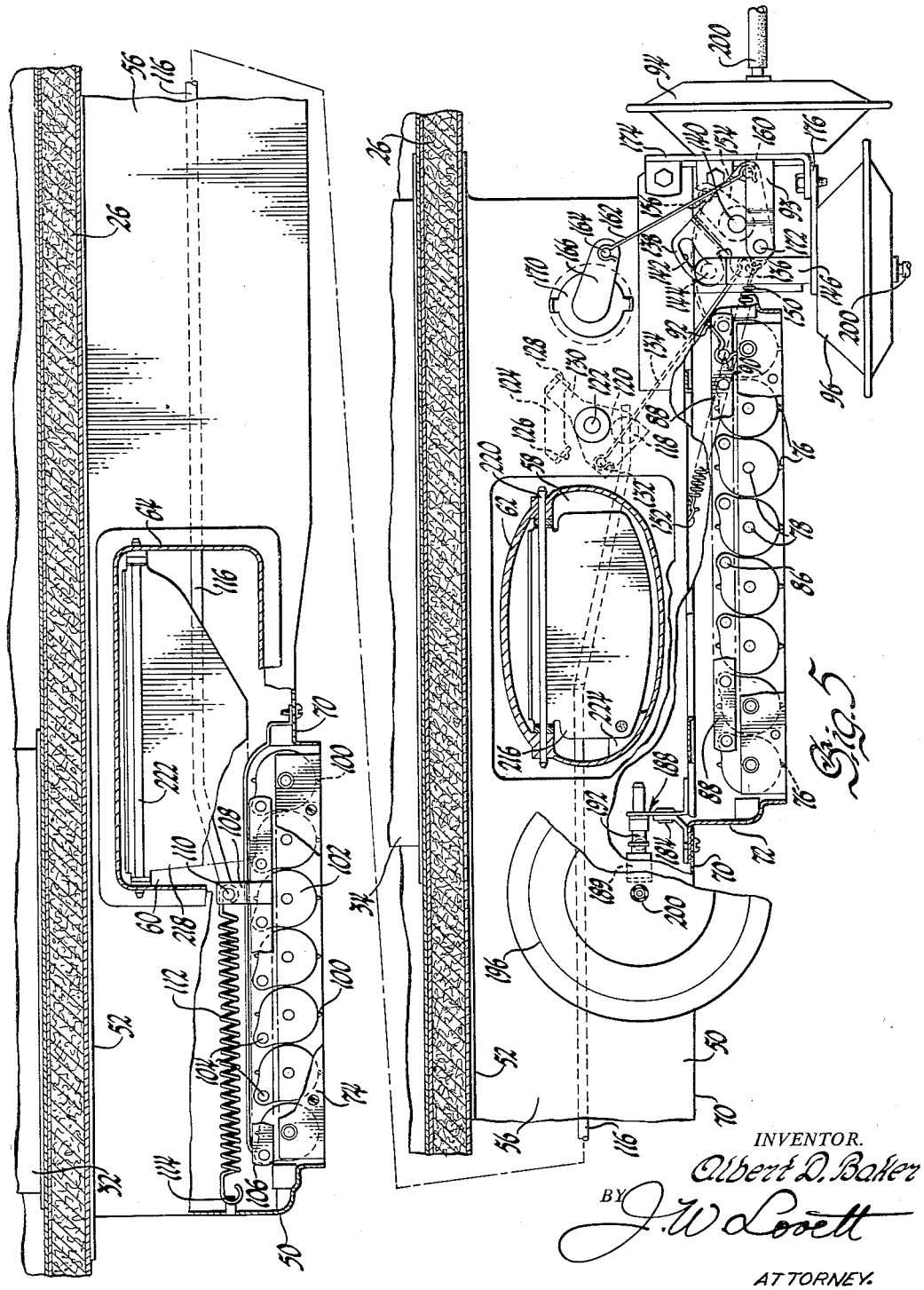
Fig. 5 is a view taken from a horizontal plane extending through the fire wall and looking downwardly at the manifold of Fig. 2 with portions removed.
Figure 6:
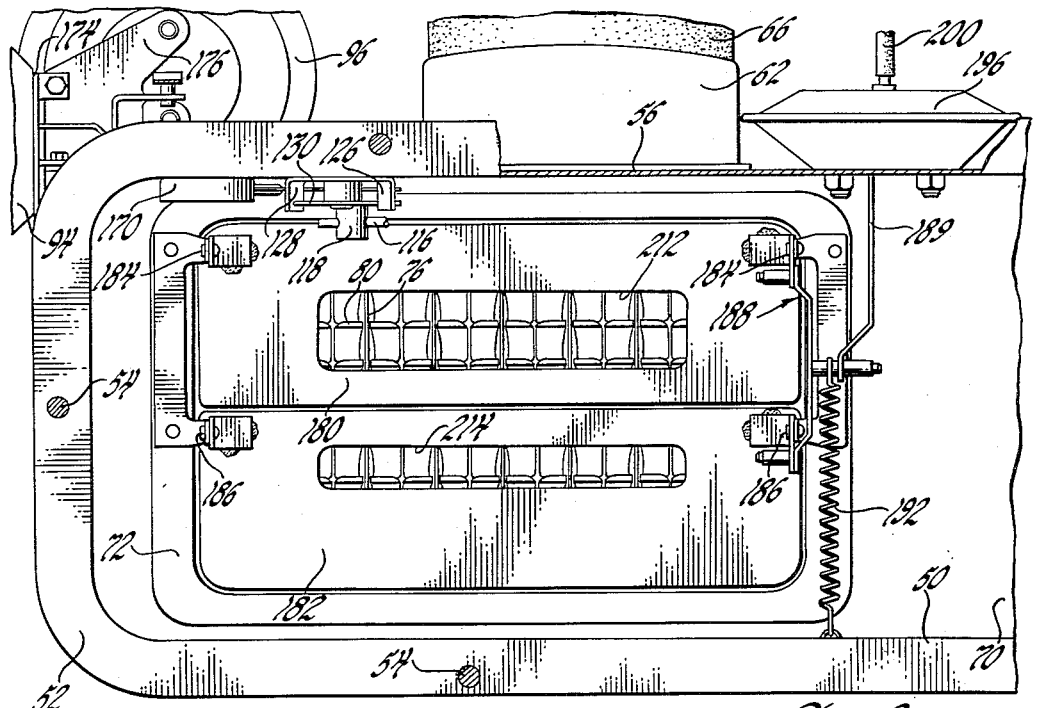
Fig. 6 is a view looking in the direction of the arrows 6—6 in Fig. 7 showing the interior of the right-hand end of the manifold of Fig. 2.

The top and horizontal wall 56 of the manifold 50 is provided with two openings 58 and 60. These openings are best seen in Figs. 3a, 4 and 5 of the drawings and are fitted with defroster ducts 62 and 64, respectively. The duct 62 communicates by means of a conduit 66 with the defroster nozzle 20. The duct 64 is connected by means of a conduit 68 with the nozzle 18.

The rearwardly facing vertical wall 70 of the manifold 50 is imperforate except for two openings made in opposite end portions thereof and facing rearwardly. One of these openings is larger than the other and is made to receive a rectangular frame-like bracket 72 constituting an air discharge outlet leading to the right side of the passenger compartment. The other and smaller opening in the wall 70 is fitted with a frame 74 defining a passage leading rearwardly into the left side of the passenger compartment.

Figure 7:
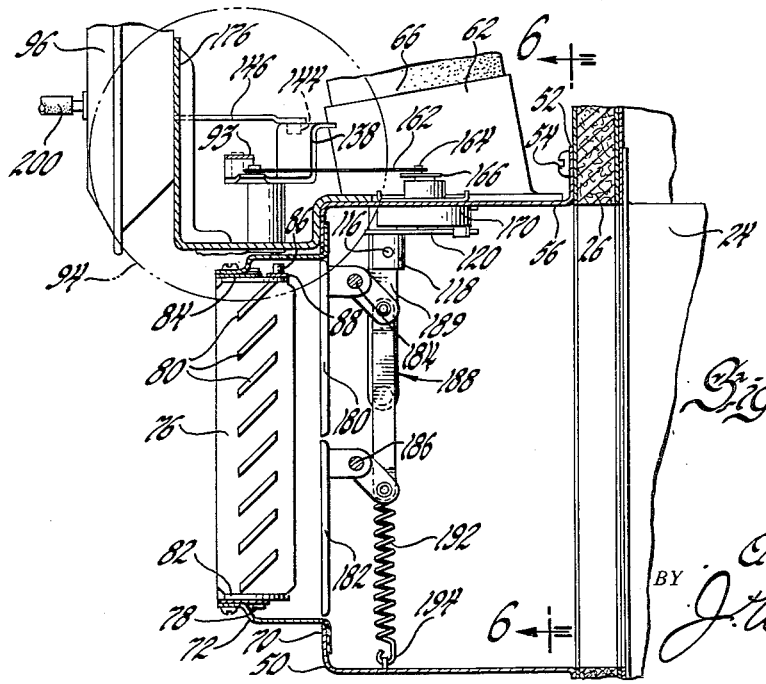
Fig. 7 is a sectional view looking in the direction of the arrows 7—7 in Fig. 3.

Eight vertical and parallel vanes 76 are mounted in the frame 72 and each of these vanes is rotatable on a vertical axis on trunnions 78 journaled in the frame. The side of each vane 76 is provided with parallel fins 80 projecting therefrom. The fins of each vane lie in parallel planes extending downwardly at an angle of approximately 45 degrees, as seen in Fig. 7. When the vanes 76 are all placed in planes extending rearwardly on the vehicle, then the fins 80 of each vane clear the fins of the adjacent vane by a small distance, as is best seen in Fig. 3. It will be noted that the fins 80 are of such width and are arranged at such an angle that each of them terminates short of the opposite edges of the supporting vane, as illustrated in Fig. 7. The proportions are such that when the vanes 76 are rotated to a sufficient extent, they will overlap and substantially close off the opening defined by the frame 72.

Integral with each vane 76 are horizontal disks 82 and 84. These disks are in contact with opposite side portions of the frame 72. Each disk 84 is also provided with an eccentrically located pin 86 journaled in a bar 88 (Figs. 5 and 7). The bar 88 is in the form of an elongated metal strip serving to hold the eight vanes 76 in parallel planes and permitting rotation of these vanes simultaneously. An additional pin 90 is fixed to and near the right end of the bar 88 (Fig. 5), and a wire hook member 92 is pivoted to this pin for actuation by two pneumatic motors 94 and 96, as will further appear.

The frame 74 at the left end of the manifold 50 is fitted with seven vertical and parallel vanes 100. These are similar to the vanes 76 except that they are provided with upper disks 102 of the opposite hand in that pins 104 are eccentrically fixed to the disks to the left of their corresponding vane trunnions whereas the pins 86 are located to the right with respect to the trunnions 78. This comparison or relation is best seen in Fig. 5. An elongated bar 106 joins the seven pins 104 so that the vanes 100 may be moved simultaneously. A bracket 108 extends forwardly from an intermediate portion of the bar 106 and is provided with an opening pivotally receiving a vertical rod end portion 110 to which is connected one end of a coil spring 112. The other end of the spring is connected as at 114 (Fig. 5) to the left end wall of the manifold 50. A long rod 116 has one end bent upwardly to form the rod end portion 110 referred to and the other end thereof is pivoted as at 118 to a lever 120 pivoted on a vertical pin 122 fixed to and suspended from the wall 56 of the manifold 50. A bracket 124 is fixed to the upper wall of the manifold and bears downwardly extending tabs 126 and 128. These tabs constitute stops for an arm 130 extending forwardly from and integral with the lever 120. The lever 120 also bears a pin 132 and this pin is connected by a rod 134 to a depending pin 136 fixed to the underside of a rotatable cam plate 138. The latter is mounted to rotate on a vertical pin 140 and bears an arcuate slot 142 in which extends a vertical pin 144. The latter is connected to a horizontal rod 146 adapted to be actuated or reciprocated by the operation of the pneumatic motor 96. One end of a coil spring 150 is connected to the vertical rod 136 and the other end of the spring is connected to a loop portion 152 formed on the manifold 50.

The lower end of the pin 140 is fixed to an arm 154 and the free end of the latter bears a pin 156 linked by the member 92, heretofore described, to the bar 88. The plate 138 is also provided with a pin 160 connected by a wire link 162 to a pin 164 on the free end of an arm 166. The latter is actually part of an electrical switch 170 for controlling the blower 22.

A reciprocable plunger 93 of the motor 94 is connected to the plate 138 by means of a pin 172. The pin 172 is movable about the pin 140 as the diaphragm in the motor 94 is flexible and permits angular movement of the plunger 93. The motors 94 and 96 are mounted on the manifold 50 by means of suitable brackets 174 and 176, respectively.

Mounted forwardly and at least partially concealed by the vanes 76 are two dampers 180 and 182. These dampers are pivoted as at 184 and 186 so that the duct opening leading to the vanes may be opened a maximum amount or closed to a predetermined extent. A linkage is indicated generally at 188 for operating these doors simultaneously and this linkage includes a vertically arranged spring 192 which has its lower end 194 joined to the bottom wall of the manifold 50. The linkage 188 is connected to the reciprocable plunger 189 of the pneumatic motor 196 for actuation thereby.

Each pneumatic motor has a suction or vacuum line 200 properly connected to push button means generally indicated at 201 and 202 in Figs. 8 to 11. The latter are so mounted on the instrument panel that the push buttons thereon are within convenient reach of the vehicle operator. These push button means are not more fully described and illustrated in the present application as various forms of such devices may be employed in carrying out the present invention. Such push button controls are in conventional use with radios and illustrative of such a control is the push button means disclosed in the Nicholson United States Patent 2,394,869 granted February 12, 1946. In the present arrangement the push button control 201 or 202 is utilized selectively to operate valve means 204 or 206 respectively to connect one or more lines 200 leading to the motors either to the atmosphere or to a line 208 which leads by means of a conduit 210 to a source of vacuum such as a vacuum booster pump on the vehicle. In Fig. 8 the line 210 is shown as also serving the motor 211 of a windshield wiper. Air admission to the lines 200 is by way of filter elements 204a and 206a in the valves 204 and 206, respectively. The latter are alike in that each includes a fixed outer plate 207 with vacuum connections 208 and a rotatable plate 209. The latter is provided with air passages in its face which determine the proper connections of the motors to the atmosphere or to the vacuum source. Other forms of valves may be employed for this purpose and, therefore, the specific valve structure is not herein disclosed.

Although the controls 201 and 202 are to the opposite hand, they are of a similar type in that they employ push button plungers each having fixed camming surfaces for determining the rotative positions of a treadle bar connected to the rotative plate of the corresponding valve. In the control 201 the plungers 300, 301, 302 and 303 have fixed camming surfaces or shoulders 304, 306, 308 and 310, respectively. A treadle bar 312 comprises two parallel bars 314 and 316 connected by end plates 318 and 320. The bar 312 is pivoted at 322 on the control frame 324 and also engages the valve plate 209 so that the latter and the bar 312 may rotate together. The plate or stator 207 of the valve assembly has straight through ports for connection to the vacuum lines 200 and a port venting to atmosphere at 204a. When a push button is depressed the corresponding plunger such as 300 is held depressed by a latch bar 326 pivoted at 328 and 330 to the frame 324. The under side of the plunger 300 bears a shoulder 332, and a spring 334 is so utilized as to urge the latch bar 326 upwardly and cause a flange 336 of the latter to engage the shoulder. Springs 340, 342, 344 and 346 urge the plungers or push buttons outwardly until released by the bar 326. Such release is brought about by pushing any other of the push buttons as the plungers are formed with releasing cam surfaces to lower the latch bar 326. Holding shoulders 350, 352 and 354 similar to the shoulder 332 are formed on the plungers 301, 302 and 303, respectively. The plungers or push buttons are given appropriate legends as seen in Figs. 9 and 10. In Fig. 10 there are three push buttons 360, 362 and 364.

A vertical pin 366 is fixed to the under side of the frame 324 of the control unit 201 and pivoted to this is a bell crank 368. One end of this crank bears a knob 370 extending from the frame 324. The other end is connected by means of a Bowden wire 372 to a valve 373 (Fig. 8) controlling the circulation of engine coolant through the heater 24. This valve is located on the forward side of the fire wall 26 and to the right of the manifold 50. Such valves are conventional and may be of the type shown in the United States Patent 2,663,499 granted December 22, 1953, in the name of Arthur J. Schutt. Such valves may be mechanically closed by rendering the thermostatic elements in the valves ineffective—i.e.—preventing actuation of the valves by the thermostatic elements. Such prevention may be brought about by introducing a member into the valve actuating mechanism through the use of a pneumatic motor. The mechanism is not disclosed herein specifically, but a pneumatic motor 378 for this purpose is shown in Figs. 1 and 8.

Each of the pneumatic motors comprises a casing enclosing a diaphragm and a motor chamber closed by the diaphragm. The arrangement is such that suction applied by means of a line 200 to each motor chamber serves to actuate a link connected to and movable with the diaphragm. Conveniently, each diaphragm and its connected link is urged toward one position by means of a spring suitably connected thereto; and the vacuum, when applied, will serve to move the diaphragm and its linkage in the other direction to a second position. In the present system, therefore, each pneumatic motor is utilized in combination with a spring to place a control means or control instrumentality in either of two alternative positions.

The dampers 180 and 182 are provided with two openings 212 and 214, respectively. These are calibrated in size and with respect to the effective air discharge opening defined by the frame 74 at the left-hand end of the manifold 50, as will further appear.

Valves for controlling the discharge of air through the defroster nozzles 18 and 20 are indicated at 218 and 216, respectively, in Fig. 5. The valve 216 is mounted freely to rotate on a shaft 220 fixed within and transverse to the defroster duct 62. The valve 218 is similarly mounted on a shaft 222 fixed within the defroster duct 64. It will be noted with respect to each of these valves that each defroster duct is not wholly blocked off or closed by the valve therein. It can, therefore, be seen that when a defroster valve is closed to the fullest extent, the duct concerned still permits air to by-pass the valve. As illustrated in the drawings, the defroster valves 216 and 218 rest in their horizontal or closed positions because of the force of gravity. If desired, however, these closed positions may be more definitely retained by the use of suitable springs (not shown) attached to the valves. Fig. 5 shows a shoulder means 224 fixed within the defroster duct 62 constituting a stop for the valve 216. Similar stop means may be provided for the valve 218. The ducts 62 and 64 are so proportioned as to permit the valves to swing upwardly about their shafts when so urged.

In Fig. 9 a manually operated switch 400 is shown as depending from the control frame 324, and it is adapted to give a two speed control of the current supplied the blower 22 from the battery 404. In Fig. 12, the switch 170 is shown as a means for shunting two resistances 406 and 408 arranged in series in the blower motor circuit. Closing of the switch 170 will give a highest or third speed for the blower for windshield defrosting creating the air pressure essential for opening the two valves 216 and 218.

Assuming that warm weather prevails and adequate ventilation without heating is desired for the passenger compartment, ambient or outside air will be admitted through the grilled opening 27 into the cowl chamber 25 and that air will pass forwardly into the blower duct 34 as well as into the upper portion of the blister 32, valves 36 and 31 being open. The air admitted through the right side of the system will then pass through the blower and rearwardly through the duct 44 as well as through the core 24a into the manifold 50. The air flowing through the left side of the system will pass rearwardly from the blister 32 and by the valve 33 into the left-hand end of the manifold 50. This flow occurs providing the motors 40 and 48 are actuated by pushing the proper buttons to apply vacuum to them to hold the valves open. Air will also pass into the passenger compartment by way of the housing 49a. In order to take advantage of the large volume of outside air introduced to the manifold 50, the two dampers 180 and 182 may be opened by causing vacuum to be applied to the motor 196. At the same time, vanes 76 as well as the vanes 100 are placed in their open positions, as illustrated in Figs. 3 and 3a, by admitting air to the pneumatic motor 94 and permitting the springs 112 and 150 to exert their force on the linkages provided. The sets of vanes 76 and 100 will have rotated in opposite directions from their overlapping or closed positions to their open positions. Air will then be admitted through the louvers formed by the fins on the vanes and will be directed downwardly, rearwardly and directly toward any passengers seated in the passenger compartment. This may be called "direct ventilation" as the air flows directly rearward with the greatest impingement against the passengers. Circulation of engine coolant is cut off from the core 24a in such circumstances by use of the motor 378. When operating the ventilation control, the heater button 300 must be depressed.

Assuming that all air is to be shut off from the passenger compartment because of weather which does not require heating or that the vehicle is not being used, the absence of vacuum will serve to close the valves 36 and 31 through action of the springs loading them and outside air will not pass through the system. One of these springs is associated with the motor 40 and a switch 40a (Fig. 1). The other is shown in Fig. 4 as 31a. It will thus be seen that air or snow will not seep in when the vehicle is parked.

In the event the windshield becomes fogged, unheated air may be forced into the duct 50 with the vanes 76 and 100 overlapping or in closed position. The overlapping or closing of the two sets of vanes is brought about by rotation of the vanes 76 in a counterclockwise direction (when viewed from above) and the simultaneous rotation of the vanes 100 in a clockwise direction through link 106 and the rod 116. This is effected by applying a vacuum to the motor 94. The motor 48 will be actuated to close the valves 31 and 33 and the blower 22 may then be employed to drive air into the manifold 50 and the resulting air pressure within the latter will serve to open the valves 216 and 218 against the force of gravity. Unheated air will then issue from the nozzles 18 and 20 and remove the fog or moisture from the windshield. Of course, in such a situation the core 24a will not be warmed by the coolant from the engine as thermostatic control of the core temperature will be employed as is conventional. If heat is required for defrosting, the core will be heated as called for under the situation prevailing.

In the event "indirect heat" is required in the passenger compartment, the pneumatic motors 94 and 96 are so operated as to cause the vanes 76 and 100 to assume immediate positions—i.e.—to be placed in planes extending outwardly and toward the rear of the vehicle. With no vacuum applied to the motor 96, the springs 112 and 150 will cause the pin 144 and plate 138 to be positioned as in the drawings; but, with vacuum applied, the plate 138 will be rotated sufficiently to place the vanes in their intermediate positions as determined by the stop tab 126. For sustained driving, this air will be effectively circulated and recirculation due to aspirator effect will bring about comfortable conditions. There will be no direct impingement on the passengers and no objectionable drafts.

Whether the heating be direct; that is, with the vanes 76 and 100 shown in the positions illustrated in the drawings, or indirect, as mentioned heretofore, it will be appreciated that provision must be made for securing uniform heating of both sides of the vehicle passenger compartment even though the heating core is located in intimate communication with the right-hand end portion of the manifold 50. With this in mind, the dampers 180 and 182 should be closed under all operative conditions except when a full discharge of air is desired as for ventilation purposes. When these dampers are closed, the openings 212 and 214 are of such size that discharge from the right-hand end of the manifold 50 is not excessive and much of the air is caused to flow to the left-hand end of the manifold for the required discharge from between the vanes 100.

From consideration of the linkage involved, it may be seen that the application of a vacuum to the pneumatic motor 94 serves to close the vanes at both ends of the manifold 50 and that such closure is against the action of the springs 112 and 150. When vacuum is supplied the motor 94, the two sets of vanes will open until the stop tab 128 is contacted by the arm 130.

When heat is being introduced into the passenger compartment in an "indirect" manner; that is, in directions extending outwardly and to the rear, a vacuum is supplied the motor 96 properly to open the vanes and the action is again against the springs 112 and 150. When vacuum is cut off from the motor 96, the springs act to open the vanes to their "direct heat" positions. It will be noted that the linkage connection 162 to the plate 138 is such that the switch 170 is operated to actuate high speed blower operation for defrosting. When operating the heat control the ventilation control button 360 must be depressed.

The defroster arrangement is quite simple and its full effectiveness is desirably realized only when adequate air pressure is built up in the manifold 50 to open the valves 216 and 218. It is well at all times to permit some air from the manifold 50 to be discharged into the area at the rear of the windshield and, for this reason, the valves 216 and 218 are not made complete or tight duct closures.

The buttons of the push button controls 201 and 202 are provided with suitable legends, as shown in Figs. 9 and 10, so that the operator may be guided in bringing about the proper operation of the various instrumentalities for any given weather condition. With the system shown, depression of the button or plungers 300 and 360 admits air to all the motors and the system is closed against seepage. The depressing of one of the buttons 301, 302 and 303 will restore the heating operation for the condition maintained before the "off" button was pushed. With respect to the motor 378, a spring is located therein which serves to disconnect the thermostatic element of the valve 373 and maintain closure of the valve. This spring is on the vacuum side of the motor diaphragm. As indicated heretofore, for "direct" and quick heat with low air velocity or no objectionable blast, the vanes direct the air rearwardly. During prolonged driving with "indirect" heating, the vanes are turned approximately 45 degrees outwardly from their positions shown and the aspirator effect with no blast ensures uniform, comfortable conditions.

It is to be noted that the housing 49a presents constant communication between the blister 32 and the passenger compartment. It is for ventilation purposes only. Heater air cannot discharge through it as the lower valve 33 will be closed when the heater is operating.

Supplementation of the system with air conditioning equipment does not require extensive revision or alteration. The blister 32 may be removed and a suitable evaporator arrangement may easily be placed in its stead with suitable variations in the push button controls. An evaporator arrangement of this type which may be supported on the engine side of the fire wall is disclosed in the application for United States patent Serial No. 457,856 filed September 23, 1954, and now Patent No. 2,824,427 granted February 25, 1958 in the name of Albert D. Baker and entitled "Vehicular Air Conditioning System,"

I claim:

1. An automatic heating, ventilating and defrosting system on a vehicle having a windshield, a passenger compartment and a fire wall partially defining said compartment, said system including a horizontal elongated manifold on the rear side of said fire wall with an end extending toward each side of the vehicle and ports leading to said compartment, pivotable vanes for closing said ports, an outside air inlet duct incorporating a blower and a heater and connected to one end portion of said manifold, means for operating said blower, at least one defroster duct leading from said manifold to said windshield for defrosting the latter, means under control of an operator for closing said vanes, a pressure actuated one-way valve in said defroster duct movable to open position responsive to air pressure developed by said blower, said valve being normally closed when said blower is not operating, and the arrangement being such that simultaneous operation of said closing means to close said vanes and said blower operating means to operate the blower is adapted to pressurize said manifold and automatically open said valve from its normally closed position by virtue of the pressurization.

2. An automotive heating and ventilating system including an elongated manifold, dampers in said manifold, an air inlet duct connecting a blower and heater directly to one end portion of said manifold, two horizontally directed outlet openings in opposite end portions of said manifold, the one outlet opening in said one end portion being controlled by said dampers, ports in said dampers proportioned substantially to equalize air discharge by way of said openings when said one outlet is traversed by said dampers.

3. An automotive heating, ventilating and defrosting system on a vehicle having a windshield and a passenger compartment, said system including an elongated manifold in said compartment, an air inlet duct connecting a blower and heater to one end portion of said manifold, two outlet openings in opposite end portions of said manifold and directed rearwardly into said compartment, means arranged to close off said openings, at least one defroster duct leading from said manifold to said windshield for defrosting purposes, and a valve in said one duct arranged only partially to close off said duct when in its extreme closed position and to open by action of air within said manifold due to said blower when said openings are closed by said means.

4. An automotive heating and ventilating system including an air distributing manifold, an outlet opening in a wall of said manifold, parallel vanes mounted on trunnions and extending transverse to said outlet opening, multiple parallel fins projecting from and uniformly spaced along each side of each of said vanes, each of said fins being of a width terminating short of opposite edges of its supporting vane to determine opposite margins on the latter, and said vanes being arranged with such spacing as to cause the margins of adjacent vanes to overlap and close said opening when the vanes are rotated into planes substantially parallel with the plane of said wall.

5. An air distributing manifold, a substantially rectangular air discharge opening in the wall of said manifold, parallel elongated vanes mounted with their lengths extending in one direction transverse to said opening and their widths overlapping substantially to close the opening when said vanes lie in planes substantially parallel with the plane of said wall, each of said vanes being rotatably mounted on an axis extending in said one direction, parallel fins extending from each side of each vane to form air directing louvers when said vanes are rotated into planes normal to said wall, said axis being located intermediate the longitudinal margins of the corresponding vane, and the structure of each including its fins having a width dimension less than that of that vane whereby the fins of adjacent vanes may clear during rotation of the latter.

6. An automotive heating and ventilating system on a vehicle having a fire wall, said system including a horizontal elongated manifold arranged along said fire wall, an outside air inlet duct incorporating a heater and arranged to discharge air into one end portion of said manifold, openings in opposite end portions of said manifold and directed rearwardly in said vehicle, sets of parallel vanes vertically and rotatably mounted on said manifold, one of said sets extending across each of said openings, fins projecting from opposite sides of each of said vanes and defining parallel louvers, said vanes being arranged to close off said openings when rotated toward the planes of the latter and to open said openings when rotated away from said planes, and means for rotating the vanes of said sets simultaneously.

7. An automotive heating and ventilating system as set forth in claim 10 and including dampers with openings therein and arranged to control the manifold opening in said one end portion and located forwardly of the vanes in that opening, and means for operating said dampers.

8. A heating, ventilating and defrosting system on a vehicle including a fire wall, an instrument panel, a passenger compartment and a windshield, a horizontal elongated manifold on the rear side of said fire wall, nozzle means leading from said manifold to the rear side of said windshield, duct means with one end arranged to receive outside air and the other end communicating with one end portion of said manifold, a blower and a heater arranged in said duct means, outlets in spaced portions of said manifold directed horizontally and rearwardly to opposite sides of said compartment and calibrated by size variation substantially to equalize air flow from said spaced portions, a set of elongated parallel vanes mounted transverse to each of said outlets, each of said vanes extending vertically and arranged to overlap an adjacent vane to close off the corresponding outlet when said vanes are rotated in one direction, fins integral with said vanes and extending downwardly and to the rear when said vanes are rotated in the other direction to an open position, instrumentalities including pneumatic motors controlling various components of said system for selecting required air flow conducive to passenger comfort, and push-button means mounted on said instrument panel and arranged to control said instrumentalities.

References Cited in the file of this patent

UNITED STATES PATENTS

| 1,299,659 | Barrs | Apr. 8, 1919 |
| 1,470,425 | Curtis | Oct. 9, 1923 |
| 1,993,069 | McConnell | Mar. 5, 1935 |
| 2,592,400 | Edwards | Apr. 8, 1952 |
| 2,621,578 | Labus | Dec. 16, 1952 |
| 2,683,205 | Matulaitis | July 6, 1954 |
| 2,707,079 | Little et al. | Apr. 26, 1955 |
| 2,741,972 | Pryne | Apr. 17, 1956 |
| 2,749,829 | Simons | June 12, 1956 |
| 2,800,285 | Muller | July 23, 1957 |
| 2,853,935 | Crowle | Sept. 30, 1958 |

FOREIGN PATENTS

| 1,737 | Great Britain | of 1899 |

UNITED STATES PATENT OFFICE
CERTIFICATE OF CORRECTION

Patent No. 2,963,954                            December 13, 1960

Albert D. Baker

It is hereby certified that error appears in the above numbered patent requiring correction and that the said Letters Patent should read as corrected below.

Column 10, line 24, for the claim reference numeral "10" read -- 6 --.

Signed and sealed this 12th day of September 1961.

(SEAL)
Attest:

ERNEST W. SWIDER
Attesting Officer

DAVID L. LADD
Commissioner of Patents

USCOMM-DC